United States Patent
Nanba et al.

(10) Patent No.: US 7,381,776 B2
(45) Date of Patent: Jun. 3, 2008

(54) CROSSLINKED RUBBER MOLDINGS FOR GOLF BALLS AND METHOD OF MANUFACTURE

(75) Inventors: Atsushi Nanba, Chichibu (JP); Jun Shindo, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 480 days.

(21) Appl. No.: 11/101,549

(22) Filed: Apr. 8, 2005

(65) Prior Publication Data

US 2006/0229414 A1    Oct. 12, 2006

(51) Int. Cl.
*A63B 37/06* (2006.01)
*A63B 37/12* (2006.01)
*A63B 37/14* (2006.01)
*B05D 3/06* (2006.01)

(52) U.S. Cl. .................. 525/387; 473/351; 473/377; 473/374; 473/373; 427/385.5; 427/493

(58) Field of Classification Search ............... 525/387; 427/385.5; 428/385.5; 473/351
See application file for complete search history.

(56) References Cited

U.S. PATENT DOCUMENTS 6,620,061 B1* 9/2003 Ichikawa et al. ........... 473/378
2003/0236135 A1* 12/2003 Hogge et al. ............... 473/351
2004/0102580 A1* 5/2004 Kataoka et al. .......... 525/332.5

FOREIGN PATENT DOCUMENTS

JP    10-43330 A    2/1998

OTHER PUBLICATIONS

Thain, Science and Golf IV, Proceedings of the World Scientific Congress of Golf, Chapter 28, Jul. 2002.*

* cited by examiner

*Primary Examiner*—Duane Smith
*Assistant Examiner*—Ives Wu
(74) *Attorney, Agent, or Firm*—Sughrue Mion, PLLC

(57) ABSTRACT

The invention provides crosslinked rubber moldings for golf balls obtained by spherically molding and crosslinking a rubber composition containing a base rubber, a co-crosslinking agent and a crosslinking agent, then impregnating the crosslinked rubber molding with a rubber compounding chemical and inducing a chemical reaction. The rubber compounding chemical-impregnated crosslinked molding has a higher surface hardness than the crosslinked molding prior to impregnation. The invention also provides a method for manufacturing such crosslinked rubber moldings for golf balls. The invention enables a sufficient rise in the surface hardness of the core to be achieved, thus increasing the degree of freedom in the design of the golf ball.

8 Claims, No Drawings

CROSSLINKED RUBBER MOLDINGS FOR GOLF BALLS AND METHOD OF MANUFACTURE

BACKGROUND OF THE INVENTION

Golf balls are known to include solid golf balls composed of a solid core obtained by molding and crosslinking a rubber composition and a one-layer or multilayer cover which encloses the solid core, and one-piece golf balls obtained by molding and crosslinking a rubber composition and using the entire resulting spherical object as the ball. In these golf balls, a rubber composition composed chiefly of a base rubber is vulcanized to produce a spherical crosslinked molding as the core. By adjusting the hardness difference between the center portion and surface portion, it is possible to increase the degree of freedom in the ball hardness profile. To this end, JP-A 10-43330 discloses a golf ball having a core in which silica particles are included at the core surface as a means for increasing the surface hardness of the ball.

However, in such golf balls, because the silica particles are merely an inorganic filler, the interfacial loss of material arises, worsening the rebound.

SUMMARY OF THE INVENTION

The object of the present invention is to provide crosslinked rubber moldings for golf balls, and a method of manufacture thereof, which enable at least the surface hardness of the core to be set to a high value and thus further increase the degree of freedom in the hardness design of the golf ball.

As a result of extensive investigations, we have discovered that, in a crosslinked rubber molding for golf balls obtained by spherically molding and fully or partially crosslinking a rubber composition containing a base rubber, a co-crosslinking agent and a crosslinking agent, then impregnating a rubber compounding chemical into the crosslinked rubber molding from the surface thereof and inducing a chemical reaction, the rubber compounding chemical-impregnated crosslinked molding can be imparted with a higher surface hardness than the crosslinked molding prior to impregnation. We have thus succeeded in further increasing the degree of freedom in the design of the ball hardness over what was possible in the prior art.

Accordingly, the invention provides:
(i) a crosslinked rubber molding for golf balls obtained by spherically molding and fully or partially crosslinking a rubber composition containing a base rubber, a co-crosslinking agent and a crosslinking agent, then impregnating the crosslinked rubber molding with a rubber compounding chemical and inducing a chemical reaction, which crosslinked rubber molding for golf balls is characterized in that the rubber compounding chemical-impregnated crosslinked molding has a higher surface hardness than the crosslinked molding prior to impregnation; and
(ii) a method of manufacturing a crosslinked rubber molding for golf balls, which method is characterized by including the steps of: molding and crosslinking a rubber composition which includes a base rubber, a co-crosslinking agent and a crosslinking agent; impregnating a rubber compounding chemical into one or more layer of the spherical crosslinked molding; then heating the rubber compounding chemical-impregnated crosslinked molding at not less than 100° C.

DETAILED DESCRIPTION OF THE INVENTION

The crosslinked rubber molding for golf balls of the invention, and the inventive method of manufacturing such moldings are described more fully below.

In the inventive crosslinked rubber molding for golf balls, a rubber composition which contains as essential ingredients a base rubber, a co-crosslinking agent and a crosslinking agent and which can be employed as the material making up a one-piece golf ball or as the core material in a two-piece solid golf ball or a multi-piece solid golf ball having three or more layers is molded under the application of heat, then is impregnated with a rubber compounding chemical.

The base rubber is preferably a diene rubber that has hitherto been used in solid golf balls, particularly a high cis-content polybutadiene rubber having a cis-1,4 bond content of at least 40%, and preferably at least 90%. A high cis-content polybutadiene synthesized with a lanthanide series catalyst is preferred, although other high-cis polybutadienes obtained with a nickel or cobalt catalyst can also be used. Specific examples include commercial products such as BROL and BR730 produced by JSR Corporation, and CB22 and CB24 produced by Bayer AG.

If desired, natural rubber, polyisoprene rubber, styrene-butadiene rubber, ethylene-propylene-diene rubber, silicone rubber and modified forms of these may be suitably compounded with the above base rubber.

Co-crosslinking agents that may be used include unsaturated carboxylic acids (e.g., acrylic acid, methacrylic acid) and/or metal salts thereof, examples of the metals being zinc, sodium, potassium, magnesium, lithium and calcium. Additional examples of suitable co-crosslinking agents include the esters of unsaturated carboxylic acids, such as butyl acrylate, ethylene glycol dimethacrylate, trimethylolpropane trimethacrylate, triallyl isocyanurate and glycidyl methacrylate.

It is desirable for the amount of co-crosslinking agent included per 100 parts by weight of the base rubber to be generally at least 5 parts by weight, and preferably at least 15 parts by weight, but generally not more than 60 parts by weight, and preferably not more than 40 parts by weight.

Exemplary crosslinking agents include organic peroxides, sulfur, sulfur-containing compounds, metal oxides, organic polyamines and modified phenol resins. The use of an organic peroxide is preferred.

Specific examples of organic peroxides include cyclohexanone peroxide, methylcyclohexanone-peroxide, acetylacetone peroxide, 1,1-di(t-hexylperoxy)-3,3,5-trimethylcyclohexane, 1,1-di(t-hexylperoxy)cyclohexane, 1,1-di(t-butylperoxy)-2-methylcyclohexane, 1,1-di(t-butylperoxy)cyclohexane, 2,2-di(t-butylperoxy)butane, n-butyl-4,4-di(t-butylperoxy)valerate, 2,2-di(4,4-di(t-butylperoxy)cyclohexyl)propane, p-methane hydroperoxide, diisopropylbenzene hydroperoxide, 1,1,3,3-tetramethylbutyl hydroperoxide, cumene hydroperoxide, t-butyl hydroperoxide, di(2-t-butylperoxyisopropyl)benzene, dicumyl peroxide, 2,5-dimethyl-2,5-di(t-butylperoxy)hexane, t-butylcumyl peroxide, di-t-hexyl peroxide, di-t-butyl peroxide, 2,5-dimethyl-2,5-di(t-butylperoxy)-3-hexane, diisobutyryl peroxide, di(3,3,5-trimethylhexanoyl) peroxide, di-n-octanoyl peroxide, dilauroyl peroxide, distearoyl peroxide, disuccinic acid peroxide, di(3-methylbenzoyl) peroxide), dibenzoyl peroxide, di(4-methylbenzoyl) peroxide, di-n-propylperoxy dicarbonate, diisopropyl peroxycarbonate, di(4-t-butylcyclohexyl) peroxydicarbonate, di(2-ethoxyethyl) peroxydicarbonate, di(3-methoxybutyl) peroxydicarbonate, di-sec-butyl peroxydicarbonate, cumyl peroxyneodecanoate, 1,1,3,3-tetramethylbutyl peroxyneodecanoate, 1-cylohexyl-1-methylethyl peroxyneodecanoate, t-butyl peroxyneodecanoate, t-hexyl peroxypivalate, 1,1,3,3-tetramethylbutyl peroxy-2-ethylhexanoate, 2,5-dimethyl-2,5-di(2-ethylhexanoylperoxy)hexane, t-hexylperoxy-2-ethylhexanoate, t-butylperoxy-2-ethylhexanoate, t-butyl peroxyisobutyrate, t-hexyl peroxyisopropyl monocarbonate, t-butyl peroxymaleic acid, t-butyl peroxy-3,3,5-trimethylhexanoate, t-butyl peroxylaurate, 2,5-dimethyl-2,5-di(3-methylbenzoyl peroxy)hexane, t-butyl peroxyisopropyl monocarbonate, t-butyl peroxy-2-ethylhexyl monocarbonate, t-hexyl peroxybenzoate, 2,5-dimethyl-2,5-di(benzoyl peroxy)hexane, t-butyl peroxyacetate, t-butyl peroxy-3-methyl benzoate, t-butyl peroxybenzoate, t-butyl peroxyallyl monocarbonate, t-butyltrimethylsilyl peroxide, 3,3',4,4'-tetra(t-butylperoxycarbonyl)benzophenone and 2,3-dimethyl-2,3-diphenylbutane.

It is desirable for the amount of crosslinking agent included per 100 parts by weight of the base rubber to be generally at least 0.1 part by weight, and preferably at least 0.2 part by weight, but generally not more than 5.0 parts by weight, and preferably not more than 3 parts by weight.

In addition, an organosulfur compound may optionally be included in the rubber composition to enhance the rebound of the spherical crosslinked rubber molding. Exemplary organosulfur compounds include thiophenols, thionaphthols, halogenated thiophenols, and metal salts thereof. Specific examples include pentachlorothiophenol, pentafluorothiophenol, pentabromothiophenol, p-chlorothiophenol, and the metal salts thereof, especially the zinc salts. The amount of organosulfur compound included per 100 parts by weight of the base rubber is preferably at least 0.2 part by weight but not more than 5 parts by weight. Moreover, elemental sulfur or an inorganic sulfur compound may be added to increase the cross-sectional hardness profile of the spherical crosslinked molded body. Known processing aids, such as that produced by Rhein Chemie under the trade name Aktiplast, may be added to improve the processability of the rubber composition. Other materials that may be added to the rubber composition include ground golf ball cores, ground golf ball cover stock, ground used golf balls, and also rubber and plastic waste from manufacturing operations that has been ground up.

In addition, it is desirable to also include in the above-described rubber base an inorganic filler such as zinc oxide, calcium carbonate or barium sulfate.

If necessary, an antioxidant can be included in an amount, per 100 parts by weight of the base rubber, of at least 0.05 part by weight, and preferably at least 0.1 part by weight, but not more than 3 parts by weight. Examples of suitable antioxidants include Nocrac NS-6 and Nocrac NS-30 (both produced by Ouchi Shinko Chemical Industry Co., Ltd.), and Yoshinox 425 (produced by Yoshitomi Pharmaceutical Industries, Ltd.).

The crosslinked rubber molding of the invention can be obtained by using a process like that employed with known golf ball compositions to cure the above-described rubber composition. The process may be one which involves, for example, mixing and milling the rubber composition with a suitable mixing and milling apparatus such as a roll mill, kneader or Banbury mixer, then molding under heat and pressure using a mold. Crosslinking can be carried out at 100 to 200° C. for a period of 10 to 40 minutes.

In the invention, the crosslinked molding obtained by molding and crosslinking the above rubber composition is then impregnated with a rubber compounding chemical. The rubber compounding chemical is preferably selected from among polymerizable monomers and the crosslinking agent used in the rubber composition. Illustrative examples of the polymerizable monomer include unsaturated carboxylic acids (e.g., acrylic acid, methacrylic acid) and/or metal salts thereof, and unsaturated carboxylic acid esters. Exemplary metal salts include the zinc, sodium, potassium, magnesium, lithium and calcium salts. Exemplary unsaturated carboxylic acid esters include butyl acrylate, trimethylolpropane trimethacrylate and glycidyl methacrylate.

The means for impregnating the rubber compounding chemical varies according to the type of rubber compound chemical. One such means involves preparing the rubber compounding chemical as an impregnating solution, and immersing the crosslinked molding in the impregnating solution at generally 0 to 40° C. for 5 to 200 hours. The longer the period of immersion, the greater the amount of chemical that soaks into the molding, and the deeper the penetration of the chemical into the crosslinked molding from the surface to the center thereof. To increase the hardness of the crosslinked molding near the center thereof, an even longer period of immersion is required. Such immersion conditions can be suitably selected according to the desired hardness profile of the crosslinked molding, including the center hardness, the surface hardness, and the hardness difference therebetween.

It is desirable for the rubber compounding chemical to be allowed to penetrate from the surface of the crosslinked molding to a depth of at least 10 mm toward the center. If the rubber compounding chemical is to be induced to penetrate even further toward the interior of the crosslinked rubber molding, it is helpful to immerse the molding in a semi-vulcanized state within the rubber compound chemical.

In the practice of the invention, by heating the above-described rubber compounding chemical-impregnated crosslinked molding, the hardness profile of the crosslinked molding can be altered so as to increase the surface hardness or the hardness difference between the center and surface. That is, when the rubber compounding chemical is impregnated from the surface of the crosslinked molding and the molding is heated, at least the surface hardness can be enhanced on account of, for example, reactions between the rubber compounding chemical and the base rubber, reactions within the rubber compound chemical, and crosslinking reactions within the base rubber. The heating temperature and heating time vary with the type of rubber compounding chemical, although heating is generally carried out at 100 to 180° C. for a period of 1 minute to 2 hours. For example, if an unsaturated carboxylic acid such as acrylic acid is used as the rubber compounding chemical, heating at 100 to 160° C. for a period of 0.5 to 2 hours is desirable. If an organic peroxide is used as the rubber compound chemical, the conditions will vary according to its half-life, although heating at 100 to 180° C. for 1 to 10 minutes is generally desirable.

It is advantageous for the crosslinked molding, after it has been impregnated with the rubber compounding chemical and cured, to have a JIS-C hardness which is at least 5 units higher, and preferably at least 10 units higher, than the crosslinked molding prior to impregnation.

If the rubber compounding chemical is a liquid, the crosslinked molding may be immersed directly therein. If the rubber compounding chemical is a solid, it can be used after dissolution in any of various solvents.

The crosslinked molding which has been impregnated with a rubber compound chemical and heat treated as described above (which molding is referred to below simply as the "chemical-impregnated molding") is controlled to a diameter of at least 30.0 mm, preferably at least 32.0 mm, and more preferably at least 35.0 mm, but not more than 41.0 mm, preferably not more than 40.5 mm, and most preferably not more than 40.0 mm.

The chemical-impregnated molding has a center hardness, expressed as the JIS-C hardness, of 30 to 80, and preferably 40 to 72. The JIS-C hardness is measured in accordance with JIS K6301-1993.

The chemical-impregnated molding has a surface hardness, expressed as the JIS-C hardness, of preferably at least 75. At a hardness of 90 to 100 and above, the hardness is difficult to measure with a JIS-C durometer. Therefore, hardnesses at this level and above can be measured using a Shore D durometer (a type D durometer according to ASTM D-2240). In such a case, it is preferable for the surface hardness of the chemical-impregnated molding to not exceed a Shore D hardness of 85.

The value of the surface hardness minus the center hardness of the chemical-impregnated molding, expressed in JIS-C hardness units, is 15 to 45, and preferably 17 to 40. If the hardness difference is small, the spin rate when the ball is hit with a driver (W#1) may increase, as a result of which the distance traveled by the ball may be unsatisfactory.

The amount of deflection by the chemical-impregnated molding when subjected to a load of 980 N (100 kg) is suitably selected according to the type of golf ball desired, although it is recommended that the deflection generally be at least 2.0 mm, and preferably at least 2.8 mm, but not more than 7 mm, and preferably not more than 5 mm.

The above-described chemical-impregnated molding is intended primarily for use in golf balls. Specific applications includes one-piece solid golf balls obtained by direct use of the chemical-impregnated molding, two-piece solid golf balls in which the chemical-impregnated molding is used as the solid core over the surface of which a cover is formed, and multi-piece solid golf balls of three or more pieces in which the chemical-impregnated molding is used as the solid core over the outside of which are formed two or more cover layers.

When the above-described chemical-impregnated molding is used as a one-piece golf ball or as the core of a multi-piece golf ball having two, three or more pieces, the golf ball can be formed to a diameter of generally at least 42.67 mm, and preferably from 42.67 to 43.00 mm, and a weight of generally 45.0 to 45.93 g. When the chemical-impregnated molding is employed as a solid core, the material used to make up the cover layer and/or mantle layer that encloses the core can be a commonly used cover material such as ionomer resin, polyester, polyurethane or nylon. Various known types of dimples can be formed by known methods on the surface of the golf ball. A known method such as compression molding or injection molding may be used to enclose the core within the cover.

As explained above, the inventive crosslinked rubber molding for golf balls and the inventive method of manufacture thereof enable at least the core surface hardness to be fully increased and thus make it possible to elevate the degree of freedom in the hardness design of golf balls. Moreover, when the crosslinked rubber molding is employed in golf balls, properties of the ball such as its spin performance and rebound can be controlled or regulated, making it possible to manufacture a diversity of golf balls tailored to the desires of the golfer.

Although the invention focuses on the hardness of a crosslinked rubber molding prior to impregnation with a rubber compounding chemical and its hardness after impregnation and chemical reaction, changes in other properties of the crosslinked rubber molding are also conceivable.

EXAMPLES

The following Examples of the invention and Comparative Examples are provided by way of illustration and not by way of limitation.

Examples 1 to 3, Comparative Examples 1 to 3

Rubber compositions based on the core formulations shown in Table 1 below were mixed and milled, then were molded and vulcanized at 160° C. for 15 minutes in each example, thereby producing spherical crosslinked moldings in Examples 1 to 3 and Comparative Examples 1 to 3. In Examples 1 to 3, the rubber compounding chemical shown in Table 1 was impregnated into the crosslinked molding, altering the hardness profile. Measurements of the cross-sectional hardness for this chemical-impregnated molding are shown in Table 2 below.

TABLE 1

|  |  | Example | | | Comparative Example | | |
|---|---|---|---|---|---|---|---|
|  |  | 1 | 2 | 3 | 1 | 2 | 3 |
| Crosslinked molding | (Rubber composition) | | | | | | |
|  | cis-1,4-Polybutadiene I | 50 | 0 | 0 | 50 | 50 | 0 |
|  | cis-1,4-Polybutadiene II | 50 | 100 | 100 | 50 | 50 | 100 |
|  | Zinc acrylate | 23.5 | 30 | 30 | 23.5 | 23.5 | 30 |
|  | Zinc oxide | 5 | 23.13 | 23.13 | 5 | 5 | 23.13 |
|  | Barium sulfate | 21.04 | 0 | 0 | 21.04 | 21.04 | 0 |
|  | Zinc stearate | 0 | 5 | 5 | 0 | 0 | 5 |
|  | Antioxidant | 0.1 | 0.1 | 0.1 | 0.1 | 0.1 | 0.1 |
|  | Zinc pentachlorothiophenol | 0.1 | 0.1 | 0.1 | 0.1 | 0.1 | 0.1 |
|  | Organic peroxide 1 | 0.6 | 0.3 | 0.3 | 0.6 | 0.6 | 0.3 |
|  | Organic peroxide 2 | 0.6 | 0.3 | 0.3 | 0.6 | 0.6 | 0.3 |
| Conditions | Temperature (° C.) | 160 | 160 | 160 | 160 | 160 | 160 |
|  | Time (min) | 15 | 15 | 15 | 15 | 15 | 15 |
| Impregnation | Impregnating solution | acrylic acid | peroxide | peroxide | — | — | — |

TABLE 1-continued

|  |  |  | Example | | | Comparative Example | | |
|---|---|---|---|---|---|---|---|---|
|  |  |  | 1 | 2 | 3 | 1 | 2 | 3 |
|  | Weight of crosslinked molding | Before impregnation | 27.07 | 32.21 | 32.02 | — | — | — |
|  |  | After impregnation | 29.10 | 32.58 | 32.18 | — | — | — |
|  |  | Impregnation weight | 2.03 | 0.37 | 0.16 | — | — | — |
|  | Temperature (° C.) |  | 23 | 23 | 23 | — | — | — |
|  | Time (h) |  | 20 | 20 | 20 | — | — | — |
| Heating conditions after impregnation | Temperature (° C.) |  | 130 | 160 | 160 | — | 130* | — |
|  | Time (min) |  | 120 | 5 | 7.5 | — | 120 | — |

Numbers entered for crosslinked molding indicate parts by weight.
*In Comparative Example 2, an impregnating solution was not used. The crosslinked molding was subjected only to heat treatment.

Trade names for most of the materials appearing in the table are as follows.
cis-1,4-Polybutadiene I: BR730 (neodymium catalyst, $ML_{1+4}$ (100° C.), 55), produced by JSR Corporation
cis-1,4-Polybutadiene II: BROL (nickel catalyst, $ML_{1+4}$ (100° C.), 43), produced by JSR Corporation
Zinc acrylate: Produced by Nihon Jyoryu Kogyo Co., Ltd.
Zinc oxide: Produced by Sakai Chemical Industry Co., Ltd.
Zinc stearate: Produced by NOF Corporation
2,2'-Methylenebis(4-methyl-6-t-butylphenol): Produced by Ouchi Shinko Chemical Industry Co.
Organic peroxide 1: Dicumyl peroxide (Percumil D), produced by NOF Corporation
Organic peroxide 2: 1,1-Bis(t-butylperoxy)-3,3,5-trimethylcyclohexane (C-40), produced by NOF Corporation
The peroxide used as the impregnating solution in Examples 2 and 3 according to the invention was di-t-hexylperoxide (Perhexyl D produced by NOF Corporation). The acrylic acid used as the impregnating solution in Example 1 was produced by Nippon Shokubai Co., Ltd.

The surface hardness is the average of the values measured at two randomly selected points on the core surface.

The core cross-sectional hardness was obtained by cutting the core in half and measuring the hardness at positions 3 to 17 mm away from the center, as noted in Table 2. Values in the table indicate the average of measurements taken at two different points located at equal distances from the center. The measurement points were located on two intersecting straight lines that pass through the center of the core cross-section.

The invention claimed is:
1. A crosslinked rubber molding for golf balls obtained by spherically molding and crosslinking a rubber composition comprising a base rubber, a co-crosslinking agent and a crosslinking agent, then impregnating the crosslinked rubber molding with a rubber compounding chemical and inducing a chemical reaction,
   wherein the rubber compounding chemical is a polymerizable monomer and/or a crosslinking agent,

TABLE 2

|  |  | Example | | | Comparative Example | | |
|---|---|---|---|---|---|---|---|
|  |  | 1 | 2 | 3 | 1 | 2 | 3 |
| Properties of core obtained | Diameter (mm) | 35.88 | 38.21 | 38.20 | 35.24 | 35.24 | 37.3 |
|  | Weight (g) | 28.53 | 34.62 | 34.55 | 27.07 | 27.07 | 32.1 |
|  | Hardness (mm) | 3.54 | 2.20 | 2.21 | 3.94 | 3.94 | 3.13 |
| Core cross-sectional hardness (distance from center in mm) | Hardness at 0 mm position (center hardness) | 61.05 | 65.4 | 68.4 | 58 | 59 | 68.4 |
|  | Hardness at 3 mm position | 63.9 | 72.6 | 72.7 | 63.9 | 63.7 | 72.4 |
|  | Hardness at 6 mm position | 66.3 | 75.1 | 75 | 67.1 | 67 | 73.3 |
|  | Hardness at 9 mm position | 69.1 | 75.3 | 75.5 | 69.7 | 69.4 | 74.4 |
|  | Hardness at 12 mm position | 72.4 | 78.7 | 78.5 | 73.7 | 73.2 | 77.2 |
|  | Hardness at 15 mm position | — | 81.4 | 81.6 | 74.8 | 75 | 79.1 |
|  | Hardness at 16 mm position | 78.6 | — | — | — | — | — |
|  | Hardness at 16.5 mm position | — | — | — | 70.3 | 70.8 | — |
|  | Hardness at 17 mm position | 80 | 79.8 | 79.4 | — | — | 77.7 |
| Surface hardness |  | 87 | 85.3 | 87.8 | 74.7 | 74 | 80.8 |
| Hardness difference between surface and center |  | 26.0 | 19.9 | 19.4 | 16.7 | 15.0 | 12.4 |

The core hardness is expressed as the amount of deflection (mm) when the core is subjected to a load of 980 N (100 kg). JIS-C hardness values were obtained by measuring the hardness in each example according to JIS K6301-1993.

wherein the rubber compounding chemical-impregnated crosslinked molding has (i) a higher surface hardness than the crosslinked molding prior to impregnation, (ii) a center hardness of from 30 to 80 in JIS-C hardness, and (iii) a surface hardness of from at least 75 in JIS-C to not more than 85 in Shore D, and wherein the rubber compounding chemical is allowed to penetrate from the surface of the crosslinked molding to a depth of at least 10 mm toward the center.

2. The crosslinked rubber molding for golf balls of claim 1, wherein the rubber compounding chemical is at least one selected from the group consisting of unsaturated carboxylic acids, metal salts of unsaturated carboxylic acids, and esters of unsaturated carboxylic acids.

3. The crosslinked rubber molding for golf balls of claim 1, wherein the rubber compounding chemical is a crosslinking agent and the crosslinking agent is an organic peroxide.

4. The crosslinked rubber molding for golf balls of claim 1, wherein the crosslinked rubber molding is a one-piece golf ball or a solid core for a solid golf ball having a multilayer construction, which solid core is enclosed, either directly or with an intervening mantle layer, by a cover.

5. A method of manufacturing a crosslinked rubber molding for golf balls, which method is characterized by comprising the steps of: molding and crosslinking a rubber composition which includes a base rubber, a co-crosslinking agent and a crosslinking agent; impregnating a rubber compounding chemical into one or more layer of the spherical crosslinked molding; then heating the rubber compounding chemical-impregnated crosslinked molding at not less than 100° C., wherein the rubber compounding chemical is a polymerizable monomer and/or a crosslinking agent, wherein the rubber compounding chemical-impregnated crosslinked molding has (i) a center hardness of from 30 to 80 in JIS-C hardness and (ii) a surface hardness of from at least 75 in JIS-C to not more than 85 in Shore D, and wherein the rubber compounding chemical is allowed to penetrate from the surface of the crosslinked molding to a depth of at least 10 mm toward the center.

6. The crosslinked rubber molding for golf balls of claim 1, wherein the value of the surface hardness minus the center hardness of the chemical-impregnated molding, expressed in JIS-C hardness units, is 15 to 45.

7. The crosslinked rubber molding for golf balls of claim 1, wherein the amount of deflection by the chemical-impregnated molding when subjected to a load of 980 N (100 kg) is at least 2.0 mm and not more than 7 mm.

8. The crosslinked rubber molding for golf balls of claim 1, which is impregnated with a rubber compounding chemical in a semi-vulcanized state.

* * * * *